United States Patent
Kim et al.

(10) Patent No.: US 9,713,098 B2
(45) Date of Patent: Jul. 18, 2017

(54) METHOD AND APPARATUS FOR PERFORMING UPLINK SCHEDULING IN A MULTIPLE-INPUT MULTIPLE-OUTPUT SYSTEM

(71) Applicants: Samsung Electronics Co., Ltd., Suwon-si, Gyeonggi-do (KR); Industry-Academic Cooperation Foundation, Yonsei University, Seoul (KR)

(72) Inventors: Beomju Kim, Seoul (KR); Sang-Wook Suh, Yongin-si (KR); Daesik Hong, Seoul (KR); Sung-Mook Lim, Seoul (KR); Wonsuk Chung, Seoul (KR)

(73) Assignees: Samsung Electronics Co., Ltd., Suwon-si (KR); Industry Academic Cooperation Foundation, Yonsei University, Seoul (KR)

(*) Notice: Subject to any disclaimer, the term of this patent is extended or adjusted under 35 U.S.C. 154(b) by 277 days.

(21) Appl. No.: 14/560,569

(22) Filed: Dec. 4, 2014

(65) Prior Publication Data
US 2015/0156786 A1 Jun. 4, 2015

(30) Foreign Application Priority Data
Dec. 4, 2013 (KR) .................. 10-2013-0150107

(51) Int. Cl.
*H04L 12/50* (2006.01)
*H04W 52/24* (2009.01)
(Continued)

(52) U.S. Cl.
CPC ........ *H04W 52/243* (2013.01); *H04B 7/0452* (2013.01); *H04W 52/146* (2013.01); *H04W 52/367* (2013.01)

(58) Field of Classification Search
CPC ..................... H04W 52/243; H04B 7/0452
(Continued)

(56) References Cited

U.S. PATENT DOCUMENTS

| | | | |
|---|---|---|---|
| 2009/0082052 A1* | 3/2009 | Bhushan | H04W 52/146 455/522 |
| 2010/0165914 A1 | 7/2010 | Cho et al. | |
| 2015/0156786 A1* | 6/2015 | Kim | H04B 7/0452 370/329 |

FOREIGN PATENT DOCUMENTS

KR 10-2014-0125643 A 10/2014

OTHER PUBLICATIONS

3GPP "E-UTRA Physical layer procedures", TS 36.213 V8.1.0, Nov. 2007.
(Continued)

*Primary Examiner* — Dang Ton
(74) *Attorney, Agent, or Firm* — Jefferson IP Law, LLP

(57) ABSTRACT

An apparatus and method for performing uplink scheduling in a Multiple-Input Multiple-Output (MIMO) system are provided. The method includes selecting User Equipments (UEs) as members of at least one user set for simultaneous transmission from among UEs from which channel information is received, using the channel information, and generating a power control value for each of the at least one user set and transmitting the power control value to UEs of the user set. The at least one user set includes a second user set including UEs selected according to interference that the UEs cause to a first user set from among remaining UEs unselected for the first user set, the first user set including UEs selected in a descending order of reception power from among the UEs from which the channel information is received.

20 Claims, 6 Drawing Sheets

(51) Int. Cl.
H04B 7/0452 (2017.01)
H04W 52/14 (2009.01)
H04W 52/36 (2009.01)

(58) Field of Classification Search
USPC .......................................................... 370/329
See application file for complete search history.

(56) References Cited

OTHER PUBLICATIONS

3GPP, R1-074850, "Uplink Power Control for E-UTRA Range and Representation of P0", Ericsson, Nov. 5-9, 2007.
Komulaine et al., "Multiuser MIMO transceiver strategy for TDD Uplink and downlink in time-varying channel," IEEE International Conference on Acoustics, Speech and Signal Processing, ICASSP. Mar. 31, 2008, pp. 3141-3144.
Yang et al.., "SVD-Assisted Multiuser Transmitter and Multiuser Detector Design for MIMO Systems," IEEE Transactions on Vehicular Technology, Feb. 2009, pp. 1016-1021.
Tomida et al., "Non-orthogonal Access with SIC in Cellular Downlink for User Fairness Enhancement", Dec. 7-9, 2011.

* cited by examiner

METHOD AND APPARATUS FOR PERFORMING UPLINK SCHEDULING IN A MULTIPLE-INPUT MULTIPLE-OUTPUT SYSTEM

CROSS-REFERENCE TO RELATED APPLICATION(S)

This application claims the benefit under 35 U.S.C. §119(a) of a Korean patent application filed on Dec. 4, 2013 in the Korean Intellectual Property Office and assigned Serial number 10-2013-0150107, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) INDUSTRY-ACADEMIC COOPERATION FOUNDATION, YONSEI UNIVERSITY

TECHNICAL FIELD

The present disclosure relates to a method and apparatus for performing uplink scheduling in a Multi-User Multiple-Input Multiple-Output (MU-MIMO) system.

BACKGROUND

An uplink MU-MIMO system supports multiple users using a pre-coding or post-coding scheme for each user in an uplink multi-antenna environment.

In the uplink multi-antenna environment, multiple users may be supported by uplink Orthogonal Multiple Access (OMA) or uplink Non-Orthogonal Multiple Access (NOMA). When the number of multiple users or the total number of antennas of multiple users is smaller than the number of antennas in a Base Station (BS), the multiple users are supported by uplink OMA. In other words, spatial resources are divided for the users in uplink OMA. Accordingly, if a BS uses a post-coding scheme based on zero-forcing beamforming in an uplink environment, there is no interference between uplink users. However, the number of users supported simultaneously (e.g., the number of simultaneous users) is limited by the number of BS antennas, that is, the number of antennas at a receiver. As a result, communication capacity (e.g., channel capacity or sum capacity) is restricted. Zero-forcing beamforming is a scheme of cancelling interference between users by steering a beam for each user in an orthogonal direction to a beam for another user.

If the number of multiple users, that is, the total number of antennas of multiple users is equal to or larger than the number of antennas at a receiver (or a BS), the multiple users are supported by uplink NOMA. As many users as or more users than the number of BS antennas may be supported simultaneously in the uplink NOAM scheme. However, if the BS uses a post-coding scheme, orthogonality is not maintained between users. The resulting interference between users may decrease communication capacity.

Although a NOMA scheme of sharing one beam among a plurality of users has been proposed for a downlink environment, this was for applying only a pre-coding scheme in the downlink environment. Therefore, this NOMA scheme is not viable for the uplink environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing scheduling to reduce performance degradation caused by interference between users and increase communication capacity in an uplink Multiple-Input Multiple-Output (MIMO) system supporting as many user terminals as or more user terminals than the number of antennas at a receiver.

In accordance with an aspect of the present disclosure, an uplink scheduling method of a Base Station (BS) in a Multi-User MIMO (MU-MIMO) system is provided. The method includes selecting User Equipments (UEs) as members of at least one user set for simultaneous transmission from among UEs from which channel information is received, using the channel information, and generating a power control value for each of the at least one user set and transmitting the power control value to UEs of the user set. The at least one user set includes a second user set including UEs selected according to interference that the UEs cause to a first user set from among remaining UEs unselected for the first user set, the first user set including UEs selected in a descending order of reception power from among the UEs from which the channel information is received.

In accordance with another aspect of the present disclosure, a method for receiving uplink scheduling information in a UE in an MU-MIMO system is provided. The method includes receiving a power control value from a Base Station (BS), and transmitting a signal to the BS based on power controlled according to the power control value. The UE is a member of a second user set including UEs selected according to interference that the UEs cause to a first user set from among remaining UEs unselected for the first user set, the first user set including UEs selected in a descending order of reception power from among UEs within a cell of the BS.

In accordance with another aspect of the present disclosure, a BS for performing uplink scheduling in an MU-MIMO system is provided. The BS includes a controller configured to control selection of UEs as members of at least one user set for simultaneous transmission from among UEs from which channel information is received, using the channel information, generation of a power control value for each of the at least one user set, and transmission of the power control value to UEs of the user set. The at least one user set includes a second user set including UEs selected according to interference that the UEs cause to a first user set from among remaining UEs unselected for the first user set, the first user set including UEs selected in a descending order of reception power from among the UEs from which the channel information is received.

In accordance with another aspect of the present disclosure, a UE for receiving uplink scheduling information in an MU-MIMO system is provided. The UE includes a controller configured to, upon receipt of a power control value from a BS, control transmission of a signal to the BS based on power controlled according to the power control value. The UE is a member of a second user set including UEs selected according to an interference that the UEs cause to a first user set from among remaining UEs unselected for the first user set, the first user set including UEs selected in a descending order of reception power from among UEs within a cell of the BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a method for reducing performance degradation caused by interference and increasing communication capacity in a Non-Orthogonal Multiple Access (NOMA) Multiple-Input Multiple-Output (MIMO) system supporting as many User Equipments (UEs) as or more UEs than the number of antennas of a Base Station (BS).

To implement the method, various embodiments of the present disclosure provide a method for forming user sets and a method for controlling power between user sets, which can increase communication capacity by clustering users based on user (terminal or transmitter) channel information.

Now, a detailed description will be given of various embodiments of the present disclosure with reference to the attached drawings. In the following description, terms that define a transmitting end, 'user', 'terminal', 'UE', and 'transmitter' are interchangeable and interpreted as the same meaning, unless otherwise specified. In addition, terms that define a receiving end, 'BS' and 'receiver' are interchangeable and interpreted as the same meaning, unless otherwise specified. While terms 'data', 'information', 'parameter', 'value', and 'signal' are described separately in the following description, these terms are interpreted as having the same property, unless otherwise specified.

Figure 1:
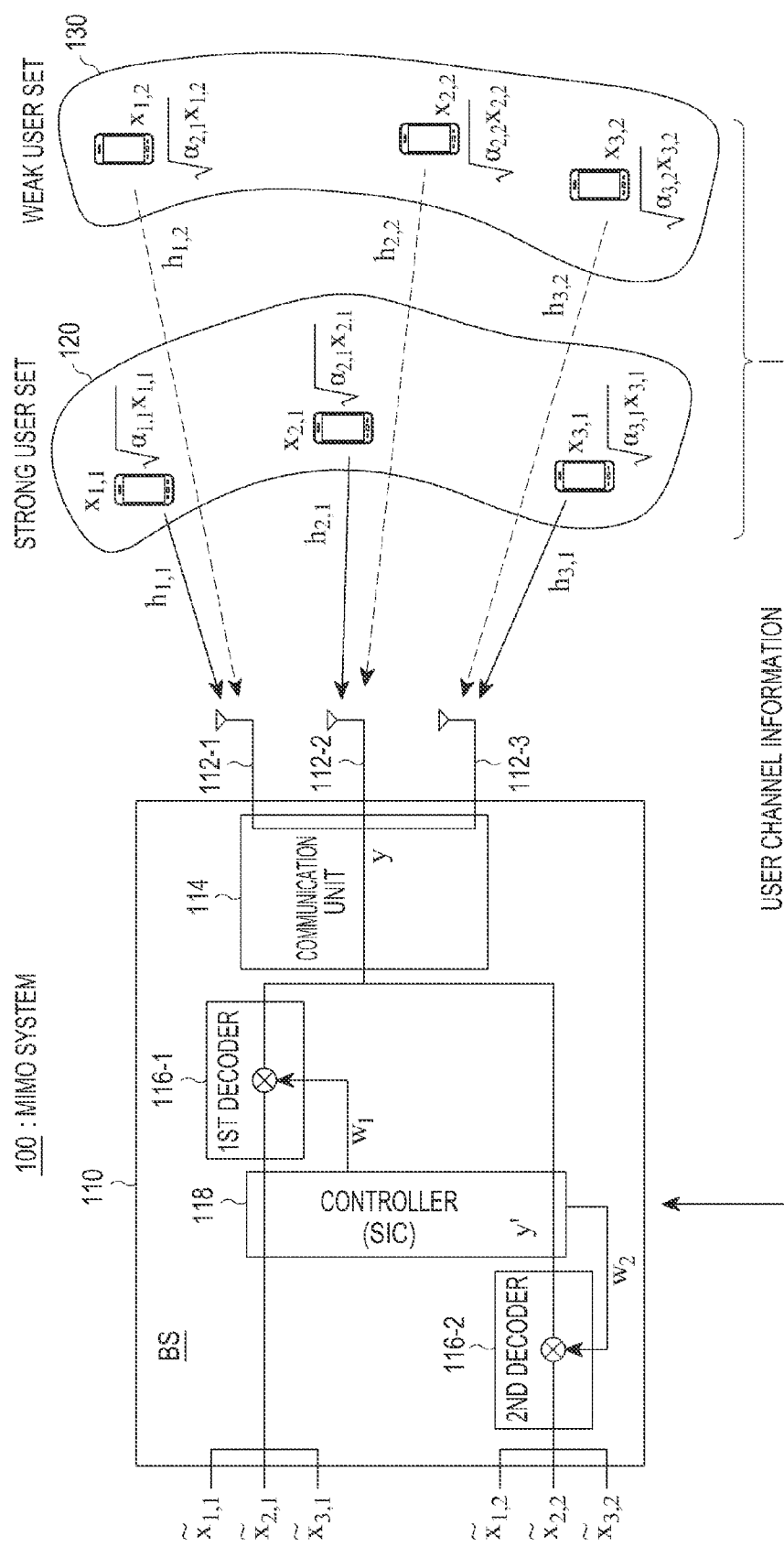
FIG. 1 illustrates an overall configuration of an uplink Multi-User Multiple-Input Multiple-Output (MU-MIMO) system according to an embodiment of the present disclosure.

FIG. 1 illustrates an overall configuration of an uplink Multi-User MIMO (MU-MIMO) system according to an embodiment of the present disclosure.

Referring to FIG. 1, an MU-MIMO system 100 according to an embodiment of the present disclosure includes a BS 110 and more UEs $x_{1,1}$, $x_{1,2}$, $x_{2,1}$, $x_{1,2}$, $x_{3,1}$, and $x_{3,2}$ than the number of antennas 112-1, 112-2, and 112-3 in the BS 110.

To help with an understanding of the present disclosure, the embodiment of the present disclosure is based on the assumption that each UE includes a single antenna. It is also assumed that the number $M_t$ of antennas 112-1, 112-2, and 112-3 is 3 in the BS 110 and six UEs $x_{1,1}$, $x_{1,2}$, $x_{2,1}$, $x_{1,2}$, $x_{3,1}$, and $x_{3,2}$ receive a service simultaneously in a cell. In the embodiment of the present disclosure, the six UEs $x_{1,1}$, $x_{1,2}$, $x_{2,1}$, $x_{1,2}$, $x_{3,1}$, and $x_{3,2}$ are grouped into two user sets 120 and 130, each including as many UEs as the number of antennas 112-1, 112-2, and 112-3 in the BS 110 (3 UEs in an embodiment). In another embodiment, the number of user sets may be at least 2. A case where there are a plurality of user sets will be described below in detail. In the embodiment of the present disclosure, between the user sets 120 and 130 that transmit signals simultaneously, the user set 120 including UEs $x_{1,1}$, $x_{2,1}$, and $x_{3,1}$ from which the BS 110 receives strong signals is referred to as a 'strong user set' and the user set 130 including UEs $x_{1,2}$, $x_{2,2}$, and $x_{3,2}$ from which the BS 110 receives weak signals is referred to as a 'weak user set.'

According to the embodiment of the present disclosure, the BS 110 performs Successive Interference Cancellation (SIC) to cancel interference caused by simultaneous transmissions from the six UEs $x_{1,1}$, $x_{1,2}$, $x_{2,1}$, $x_{1,2}$, $x_{3,1}$, and $x_{3,2}$. In an uplink environment, the BS 110 decodes signals received from the UEs $x_{1,1}$, $x_{2,1}$, and $x_{3,1}$ near to the BS 110 without interference cancellation. On the other hand, the BS 110 decodes signals received from the UEs $x_{1,2}$, $x_{2,2}$, and $x_{3,2}$ relatively far from the BS 110 after interference cancellation.

Specifically, the BS 110 includes a communication unit 114, first and second decoders 116-1 and 116-2, and a controller 118.

The communication unit 114 receives a plurality of signals from the UEs $x_{1,1}$, $x_{1,2}$, $x_{2,1}$, $x_{1,2}$, $x_{3,1}$, and $x_{3,2}$. Each received signal may include user channel information received from a UE that has transmitted the signal. As described later, the communication unit 114 transmits a power control factor (or a power control value) to each UE to mitigate interference between UEs through power control.

The first decoder 116-1 decodes signals $h_{1,1}$, $h_{2,1}$, and $h_{3,1}$ received from the UEs $x_{1,1}$, $x_{2,1}$, and $x_{3,1}$ from among the signals $h_{1,1}$, $h_{2,1}$, $h_{3,1}$, $h_{1,2}$, $h_{2,2}$, $h_{3,2}$ received through the communication unit 114.

The second decoder 116-2 decodes signals $h_{1,2}$, $h_{2,2}$, and $h_{3,2}$ received from the UEs $x_{1,2}$, $x_{2,2}$, and $x_{3,2}$ from among the signals $h_{1,1}$, $h_{2,1}$, $h_{3,1}$, $h_{1,2}$, $h_{2,2}$, $h_{3,2}$ received through the communication unit 114. Specifically, the second decoder 116-2 decodes the received signals $h_{1,2}$, $h_{2,2}$, and $h_{3,2}$ from which interference was cancelled through SIC by the controller 118.

The controller 118 is configured to provide overall control and management to the BS 110. The controller 118 performs SIC on signals received from the UEs $x_{1,2}$, $x_{2,2}$, and $x_{3,2}$ of the user set 130 from among signals received from the UEs $x_{1,1}$, $x_{1,2}$, $x_{2,1}$, $x_{1,2}$, $x_{3,1}$, and $x_{3,2}$. Particularly, the controller 118 is configured to group a plurality of UEs into a plurality of user sets using user channel information received from the UEs, determine power control factors for the UEs of the user sets to cancel interference between the UEs, and transmit the power control factors to the UEs.

The embodiment of the present disclosure will be described below from a viewpoint of the operation of the controller 118.

The controller 118 divides the UEs $x_{1,1}$, $x_{1,2}$, $x_{2,1}$, $x_{1,2}$, $x_{3,1}$, and $x_{3,2}$ into user sets each including as many UEs as the number $M_t$ of antennas 112-1, 112-2, and 112-3 in the BS 110.

The UEs of the same user set perform the same power control. For example, $\sqrt{\alpha_{1,1}}$, $\sqrt{\alpha_{2,1}}$, and $\sqrt{\alpha_{3,1}}$ are assigned to the three UEs $x_{1,1}$, $x_{2,1}$, and $x_{3,1}$ of the strong user set 120. Because the UEs of the same user group perform the same power control, the same power control factor $\sqrt{\alpha_{1,1}} = \sqrt{\alpha_{2,1}} = \sqrt{\alpha_{3,1}} = \sqrt{\alpha_1}$ is set for the UEs. Likewise, the same power control factor $\sqrt{\alpha_{1,2}} = \sqrt{\alpha_{2,2}} = \sqrt{\alpha_{3,2}} = \sqrt{\alpha_2}$ is set for the weak user set 130.

The UEs of the two user sets 120 and 130 receive power control factors determined by the controller 118 of the BS 110, perform power control using the received power control factors to mitigate interference, and transmit power-controlled signals to the BS 110. The BS 110 receives the power-controlled signals from the UEs on channels $h_{i,j}$. Herein, $h_{i,j}$ represents a MIMO channel for an $i^{th}$ user of a $j^{th}$ user set.

For example, the BS 110 receives signals from the three UEs $x_{1,1}$, $x_{2,1}$, and $x_{3,1}$ of the strong user set 120 on channels $h_{1,1}$, $h_{2,1}$, and $h_{3,1}$. The controller 118 of the BS 110 generates a post-coding matrix $W_1$ to cancel interference between the UEs $x_{1,1}$, $x_{2,1}$, and $x_{3,1}$ of the strong user set 120 and outputs the post-coding matrix $W_1$ to the first decoder 116-1. $W_1$ is provided based on the channels of the UEs $x_{1,1}$, $x_{2,1}$, and $x_{3,1}$ of the strong user set 120. The first decoder 116-1 decodes the signals received from the three UEs $x_{1,1}$, $x_{2,1}$, and $x_{3,1}$ of the strong user set 120 by multiplying the signals by the post-coding matrix $W_1$. However, the signals (uplink signals) received at the BS 110 include the signals from the UEs $x_{1,2}$, $x_{2,2}$, and $x_{3,2}$ of the weak user set 130 as well as the signals from the UEs $x_{1,1}$, $x_{2,1}$, and $x_{3,1}$ of the strong user set 120. As a result, interference also exists between the strong users and the weak users during decoding using the post-coding matrix $W_1$.

To mitigate interference that the UEs $x_{1,1}$, $x_{2,1}$, and $x_{3,1}$ of the strong user set 120 cause to the UEs $x_{1,2}$, $x_{2,2}$, and $x_{3,2}$ of the weak user set 130, the controller 118 of the BS 110 performs SIC on the signals of the strong user set 120 decoded by the first decoder 116-1. After the SIC operation, the controller 118 generates a post-coding matrix $W_2$ for each of the channels of the UEs $x_{1,2}$, $x_{2,2}$, and $x_{3,2}$ of the weak user set 130 in order to cancel the interference that the strong user set 120 causes to the UEs $x_{1,2}$, $X_{2,2}$, and $x_{3,2}$ of the weak user set 130, and outputs the post-coding matrix $W_2$ to the second decoder 116-2. The second decoder 116-2 decodes the signals received from the three UEs $x_{1,2}$, $x_{2,2}$, and $x_{3,2}$ by multiplying the SIC-processed signals of the UEs $x_{1,2}$, $x_{2,2}$, and $x_{3,2}$ by the post-coding matrix $W_2$. Thus, the signals received from the UEs $x_{1,2}$, $x_{2,2}$, and $x_{3,2}$ of the weak user set 130 may be decoded without interference caused by the strong user set 120.

The signals transmitted by the UEs $x_{1,1}$, $x_{2,1}$, and $x_{3,1}$ of the strong user set 120 also experience interference from the signals transmitted by the UEs $x_{1,2}$, $x_{2,2}$, and $x_{3,2}$ of the weak user set 130, even after the signals transmitted by the UEs $x_{1,1}$, $x_{2,1}$, and $x_{3,1}$ of the strong user set 120 are multiplied by the post-coding matrix $W_1$. As a channel gain (a reception power from the UEs) of the weak user set 130 gets smaller, the interference gets smaller. Accordingly, to mitigate interference that the weak user set 130 causes to the strong user set 120, the weak user set 130 is formed to include UEs having small channel gains.

However, as the channel gain of the weak user set 130 decreases, the reception power of signals from the UEs of the weak user set 130 decreases, thereby degrading communication performance. In this context, there is a need for a method for forming user sets, which can reduce interference that the weak user set 130 causes to the UEs of the strong user set 120, while increasing the reception power of signals from the UEs of the weak user set 130.

An embodiment of the present disclosure provides an algorithm for determining user sets that will perform simultaneous transmission, using user channel information.

A detailed description will be given of a method for determining user sets that will perform simultaneous transmission, using user channel information according to an embodiment of the present disclosure.

Figure 2:
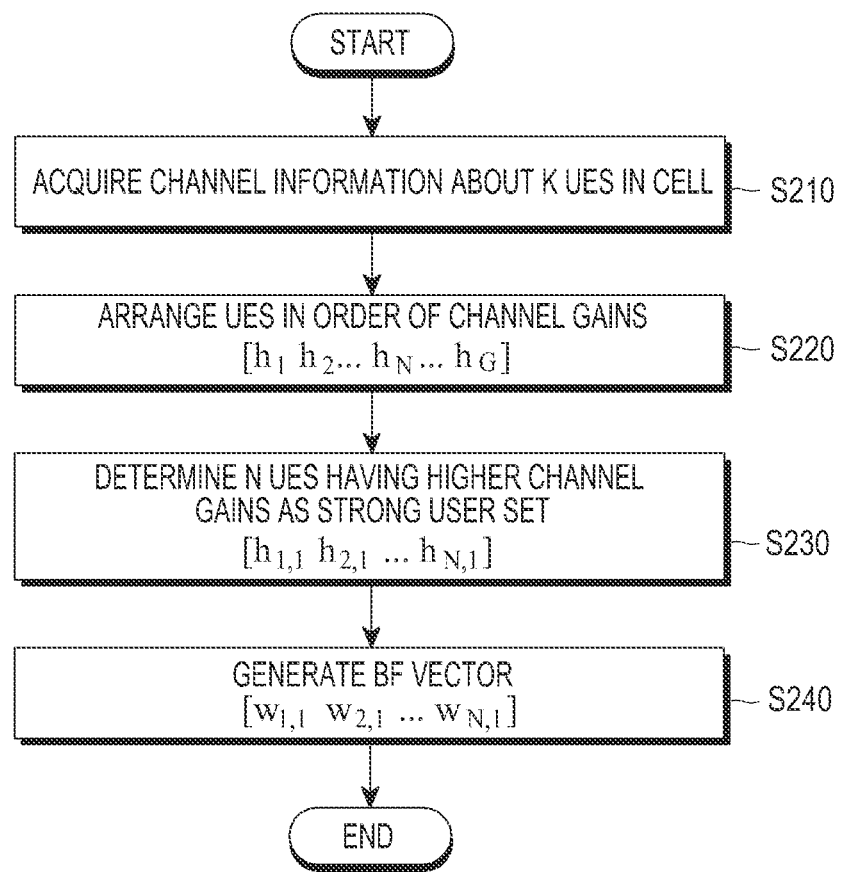
FIG. 2 is a flowchart illustrating a method for determining a strong user set according to an embodiment of the present disclosure.

FIG. 2 is a flowchart illustrating a method for determining a strong user set according to an embodiment of the present disclosure. Each operation illustrated in FIG. 2 may be performed in the controller 118 of the BS 110 illustrated in FIG. 1. For the convenience of description, the following description is given with the appreciation that the BS 110 performs the operations of FIG. 2. Therefore, unless otherwise specified, the BS 110 is described as performing the following operations.

Referring to FIG. 2, on the assumption that the number of UEs requiring an uplink service in a cell is K (where K is a natural number) for maximizing communication capacity, the BS 110 acquires user channel information from each of the K UEs by receiving the user channel information in operation S210. For example, the user channel information is represented as channel gains.

In operation S220, the BS 110 arranges the channel gains of the K UEs in a descending order as in Equation 1.

$$[h_1 h_2 \ldots h_N \ldots h_K] \quad \text{Equation 1}$$

The BS 110 selects as many UEs as the number N of antennas in the BS 110 in a descending order of the channel gains of the K UEs and groups the selected UEs into the strong user set 120 in operation S230. In other words, the N UEs having higher channel gains are determined as the strong user set 120, as expressed as Equation 2.

$$[h_{1,1} h_{2,1} \ldots h_{N,1} \ldots h_{K,1}] \quad \text{Equation 2}$$

In operation S240, the BS 110 generates a BeamForming (BF) vector or a post-coding matrix $[W_{1,1}, W_{2,1}, \ldots, W_{N-1}]$ based on the respective channel gains of the UEs of the strong user set 120.

Since signals from the strong user set 120 do not interfere with other UEs during SIC in an uplink environment, communication capacity can be increased simply by selecting UEs having high channel gains with no regard to interference, as described before with reference to FIG. 2.

Figure 3:
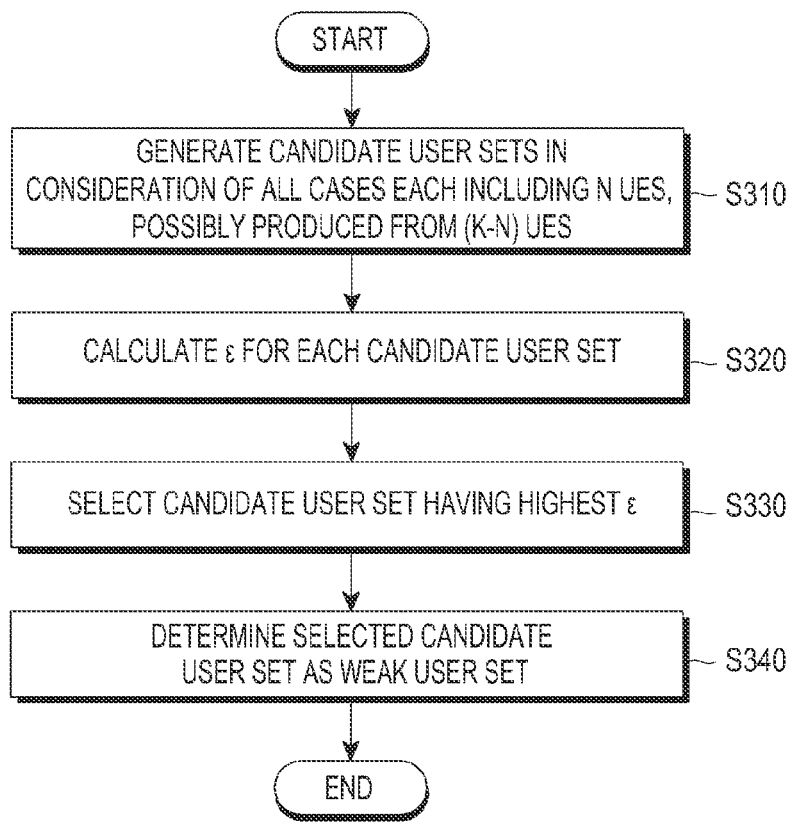
FIG. 3 is a flowchart illustrating a method for determining a weak user set according to an embodiment of the present disclosure.

FIG. 3 is a flowchart illustrating a method for determining a weak user set according to an embodiment of the present disclosure. Each operation illustrated in FIG. 3 may be performed in the controller 118 of the BS 110 illustrated in FIG. 1. For the convenience of description, the following description is given with the appreciation that the BS 110 performs the operations of FIG. 2. Therefore, unless otherwise specified, the BS 110 is described as performing the following operations. Once the strong user set 120 is determined in operations S210 to S240 of FIG. 2, an operation for determining the weak user set 130 illustrated in FIG. 3 may be performed.

As described before, for the purpose of increasing the communication capacity of the UEs of the weak user set 130, the BS 110 may consider a method for forming the weak user set by selecting UEs in a descending order of the received power levels (or channel gains) of signals received from the remaining UEs except for the UEs of the strong user set 120.

On the other hand, for the purpose of increasing the overall communication capacity of a system by reducing interference that the weak user set 130 causes to the strong user set 120, the BS 110 may consider a method for forming the weak user set 130 by selecting UEs having low channel gains (or reception power levels) from among the remaining UEs except for the UEs of the strong user set 120. The increase of the communication capacity of the UEs of the weak user set 130 and the increase of the overall communication capacity of the system are in a tradeoff relationship. Accordingly, an appropriate tradeoff scheme is required in order to balance between the increase of the communication capacity of the UEs of the weak user set 130 and the increase of the overall communication capacity of the system.

In another embodiment of the present disclosure, the weak user set 130 that will transmit signals simultaneously with the strong user set 120 is selected from among candidate user sets, taking into account the differences $\epsilon$ between the reception power levels of signals received from the candidate user sets and interference that the candidate user sets cause to the strong user set 120.

Referring to FIG. 3, the BS 110 generates candidate user sets for the weak user set 130 in operation S310. Specifically, the BS 110 determines the remaining (K-N) UEs except for the UEs grouped into the strong user set 120 according to Equation 2. The channel gains of the (K-N) UEs may be defined as a user set S by Equation 3.

$$S = [h_{N+1} \ldots h_K] \quad \text{Equation 3}$$

Then, all possible cases of weak user sets that may be produced from the UEs (channels or channel gains) of the user set S given by Equation 3 are considered. Specifically, the BS 110 generates candidate user sets, taking into account all possible cases each having as many UEs (channels or channel gains) as the number N of antennas of the BS 110 which may be produced from the (K-N) UEs (channels or channel gains) of the user set S. The candidate user sets $A_1, A_2, \ldots, A_M$ are given as Equation 4.

$$A_1, A_2, \ldots, A_M, \text{ where } M = {}_{K-(N+1)}C_N \quad \text{Equation 4}$$

Each of the candidate user sets $A_1, A_2, \ldots, A_M$ described in Equation 4 includes, as its elements, as many UEs as the number N of the BS 110 from among the UEs (channels or channel gains) of the user set S of Equation 3, defined by Equation 5.

$$A_m \subset S \text{ for } \forall m, \; m=1, 2, \ldots, {}_{K-(N+1)}C_N \quad \text{Equation 5}$$

If the candidate user sets are determined according to Equation 3, Equation 4, and Equation 5, the BS 110 calculates a parameter $\epsilon$ for an $n^{th}$ candidate user set from among all user sets defined as Equation 5. The parameter $\epsilon$ is defined as the difference between the reception power of signals received from each candidate user set and interference that the candidate user set causes to the strong user set, expressed as Equation 6.

$$\varepsilon = \sum_{n=1}^{N} \left( |h_{n,2}|^2 \beta_{n,2} - \left( \sum_{k=1}^{N} |w_{n,1} h_{k,2}|^2 \beta_{k,2} \right) \right) \quad \text{Equation 6}$$

where $\beta_{n,2}(\beta_{k,2})$ is a noise to power ratio of an $n^{th}$ ($k^{th}$) UE included in the weak user set after a legacy power control scheme is performed for an uplink, particularly a power control scheme of a $3^{rd}$ Generation Partnership Project (3GPP) Long Term Evolution (LTE) system, and $w_{n,1}$ is a post-coding vector formed based on the channel of an $n^{th}$ UE of the strong user set. Therefore, $|h_{n,2}|^2 \beta_{n,2}$ is the reception power of signals from an $n^{th}$ candidate user set that may be selected as the weak user set and $$\left( \sum_{k=1}^{N} |w_{n,1} h_{k,2}|^2 \beta_{k,2} \right)$$

is interference that the $n^{th}$ candidate user set causes to the strong user set.

In operation S330, the BS 110 selects a candidate user set having the highest of the parameters $\epsilon$ of all candidate user sets calculated in operation S320.

The BS determines the candidate user set selected in operation S330 as the weak user set, thereby completing the operation for determining the weak user set in operation S340.

As the candidate user set having the highest value of $\epsilon$ is selected as the weak user set as described above, the signal strength of the weak user set is increased and interference with the strong user set is minimized. As a consequence, the communication capacities of both the weak user set and the overall system may be maximized, which may be expressed as Equation 7.

$$[h_{1,1} h_{2,2} \ldots h_{N,2}] = A_{m^*} = \max_{m^* \in [1,2,M]} \varepsilon(A_{m^*}) \quad \text{Equation 7}$$

where $$M = {}_{K-(N+1)}C_N$$

In summary, since the strong user set does not interfere with other UEs, the BS 110 sets the strong user set by selecting as many UEs having higher channel gains as the number of antennas of the BS 110 in order to maximize performance.

The BS 110 sets, as a weak user set that will transmit signals simultaneously with the strong user set, a candidate user set having the largest difference between the reception power of signals from the candidate user set and interference that the candidate user set causes to the strong user set, to thereby increase the communication capacities of both the UEs of the weak user set and the UEs of the strong user set.

The increase of the communication capacities of the strong user set and the weak user set by means of the user set determination algorithm according to the embodiment of the present disclosure may maximize the overall communication capacity.

A power control operation that maximizes the communication capacity of the UEs of each user set after the user set determination operation is completed will be described below.

Figure 4:
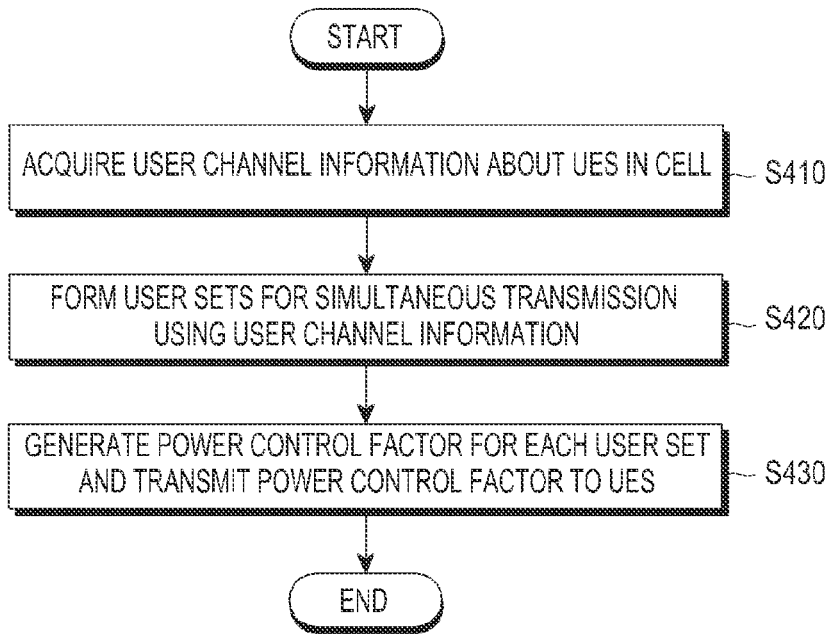
FIG. 4 is a flowchart illustrating an overall operation of a Base Station (BS) according to an embodiment of the present disclosure.

FIG. 4 is a flowchart illustrating a power control operation according to an embodiment of the present disclosure.

According to the embodiment of the present disclosure, all UEs of the strong user set and the weak user set are to maintain (ensure) their communication capacities at or above a level that may be achieved in a legacy OMA system and are to maximize the total communication capacity of the UEs of the two user sets. For this purpose, power control needs to be optimized, as given by Equation 8.

$$(\alpha_{n,1}^*, \alpha_{n,2}^*) = \arg\max_{(\alpha_{n,1}^*, \alpha_{n,2}^*)} (R_{n,1} + R_{n,2}) \quad \text{Equation 8}$$

s.t.

$$R_{n,1} \geq \frac{1}{2}(R_{n,1-OMA})$$

&

$$R_{n,2} \geq \frac{1}{2}(R_{n,2-OMA})$$

for $$1 \leq n \leq N$$

where $R_{n,1}$ is the communication capacity of a UE in the strong user set, $R_{n,2}$ is the communication capacity of a UE in the weak user set, $\alpha_{n,1}$ and $\alpha_{n,2}$ are power control factors transmitted to $n^{th}$ UEs of the strong and weak user sets, respectively, and N is the number of antennas in the BS 110.

The solutions of $\alpha_{n,1}$ and $\alpha_{n,2}$ may be achieved from a Karush-Kuhn-Tucker (KKT) condition. In this case, the power control factor $\alpha_{n,1}$ of the UEs of the strong user set may be expressed as Equation 9.

$$\alpha_{n,1} = 1 \text{ for } \forall n \quad \text{Equation 9}$$

Equation 9 may imply that the UEs of the strong user set may transmit signals without additional power control for interference mitigation. This is because signals from the UEs of the strong user set do not interfere with other UEs.

On the other hand, the power control factor $\alpha_{n,2}$ of the UEs of the weak user set that interfere with the strong user set may be determined according to the following two conditions described by Equation 10 and Equation 11.

$$E_n \left[ \frac{\sum_{k=1}^{N} |w_{n,1} h_{k,2}|^2 \beta_{k,2}}{\sqrt{1 + |h_{n,1}|^2 \beta_{n,1}} + 1} \right] \leq \left( 1 - E_n \left[ \frac{\sqrt{1 + |h_{n,1}|^2 \beta_{n,1}} - 1}{|h_{n,1}|^2 \beta_{n,1}} \right] \right) \quad \text{Equation 10}$$

$$E_n \left[ \frac{\sum_{k=1}^{N} |w_{n,1} h_{k,2}|^2 \beta_{k,2}}{\sqrt{1 + |h_{n,1}|^2 \beta_{n,1}} + 1} \right] > \left( 1 - E_n \left[ \frac{\sqrt{1 + |h_{n,1}|^2 \beta_{n,1}} - 1}{|h_{n,1}|^2 \beta_{n,1}} \right] \right) \quad \text{Equation 11}$$

where $E_n[\ ]$ is an operator of calculating an average expected value for a variable n, $w_{n,1}$ is a post-coding vector for an $n^{th}$ UE in the strong user set, $h_{n,1}$ is a channel vector for the $n^{th}$ UE in the strong user set, $\beta_{n,1}$ is a noise to power ratio of the $n^{th}$ UE in the strong user set after power control in a power control scheme of the legacy 3GPP LTE system, $h_{k,2}$ is a channel of a $k^{th}$ UE in the weak user set, and $\beta_{k,2}$ is a noise to power ratio of the $k^{th}$ UE in the weak user set after power control in the power control scheme of the legacy 3GPP LTE system.

In Equation 10 and Equation 11, the left term $$E_n \left[ \frac{\sum_{k=1}^{N} |w_{n,1} h_{k,2}|^2 \beta_{k,2}}{\sqrt{1 + |h_{n,1}|^2 \beta_{n,1}} + 1} \right]$$

is proportional to interference that the weak user set causes to the strong user set, and the right term $$\left( 1 - E_n \left[ \frac{\sqrt{1 + |h_{n,1}|^2 \beta_{n,1}} - 1}{|h_{n,1}|^2 \beta_{n,1}} \right] \right)$$

is proportional to the signal strength of the UEs of the strong user set. Thus, Equation 10 describes a case in which interference caused to the strong user set by the weak user set is less than the signal strength of the strong user set and Equation 11 describes the opposite case. If the condition of Equation 10 is satisfied, it may be determined that the strong user set is relatively robust against interference. Accordingly, the UEs of the weak user set transmit signals with maximum power within a range allowed by the legacy power control scheme without additional power control based on interference that the weak user set causes to the strong user set. In this case, the UEs of the weak user set receive a first power control factor $\alpha_1$ indicating transmission with maximum power (first power) within the range allowed by the legacy power control scheme. The first power control factor $\alpha_1$ may be expressed as Equation 12.

$$\alpha_2 = 1 \quad \text{Equation 12}$$

On the other hand, if the condition of Equation 11 is satisfied, this corresponds to a case in which the UEs of the strong user set are relatively sensitive to interference. Then, interference should be mitigated by additional power control. In addition, since the differences between the magnitudes of signals from the UEs of the strong user set and the magnitudes of interference signals get narrowed, it may be difficult to apply SIC. Thus, if the condition of Equation 11 is satisfied, additional power control is required in order to implement SIC and mitigate interference between UEs. In this case, the UEs of the weak user set receive a second power control factor $\alpha_2$ indicating transmission with power based on the additional power control scheme (or second power lower than the first power) from the BS 110. The second power control factor $\alpha_2$ is given as Equation 13.

$$\alpha_2 = \frac{\left(1 - E_n\left[\left(\sqrt{1+|h_{n,1}|^2 \beta_{n,1}} - 1\right)/|h_{n,1}|^2 \beta_{n,1}\right]\right)}{E_n\left[\left(\sum_{k=1}^{N} |w_{n,1} h_{k,2}|^2 \beta_{k,2}\right)/\left(\sqrt{1+|h_{n,1}|^2 \beta_{n,1}} + 1\right)\right]} < 1 \quad \text{Equation 13}$$

The second power control factor $\alpha_2$ is less than 1 and the BS 110 controls the weak user set to transmit signals with a power value smaller than a power value determined by the legacy transmission power control scheme.

A current LTE system adopts a power control scheme that compensates for path loss, not focusing on mitigation of interference between UEs because interference between UEs is not as severe as in OMA. A basic uplink power control scheme is performed in an open loop in which a power control factor is determined during initial access of a user and lasts until the connection is terminated.

In contrast, interference is severe between UEs in the embodiment of the present disclosure. As a result, if an additional power control scheme considering interference at each change of channels is required, the above-described power control factor determination method described in Equation 9, Equation 12, or Equation 13 may be used. The power control factor determination method should be performed in a closed loop in which a power control factor is changed at each change of channels even after a user initially accesses an uplink. A final UE transmission power value determined by considering a legacy LTE power control factor and an additional power control factor proposed by the present disclosure may be expressed as Equation 14.

$$P=\min\{P_{max},P_0+10\log_{10}M+\gamma L+\Delta_{mcs}+f(\Delta_i)+10\log_{10}\alpha\}[dB] \quad \text{Equation 14}$$

where $P_{max}$ is a maximum power value available to a UE, $P_0$ is a set transmission power that the UE requests for Quality of Service (QoS), M is the number of resource blocks used by the UE, and $\gamma$ and L are a cell-specific path loss compensation value and a UE-estimated path loss compensation value. These parameters are all applied in the open loop.

In Equation 14, $\Delta_{mcs}$ and $f(\Delta_i)$, which are applied in the closed loop, are a power variation requested to the UE when an Adaptive Modulation and Coding (AMC) is used and a value reflecting a change considered when a control channel and a data channel are correlated, respectively.

In Equation 14, a is a power control factor between 0 and 1 for interference mitigation between UEs, expressed in 5 bits. Further, $\alpha$ is one of a power control factor $\alpha_1$ set for the strong user set and a power control factor $\alpha_2$ set for the weak user set. For example, if a is the power control factor $\alpha_1$ set for the strong user set, $\alpha_1$ may be set to 1. If a is the power control factor $\alpha_2$ set for the weak user set, $\alpha_2$ may be set to a value larger than 0 and lower than 1 ($0<\alpha_2<1$).

In another embodiment of the present disclosure, it is assumed that the total number of user sets that will perform simultaneous transmissions is L and L>2. It is also assumed that the channel gain of a first user set is highest and user sets with indexes nearer to an $L^{th}$ user set have lower channel gains. In this case, i is a user set indicator ($1 \leq i \leq L$). Then, Signal to Interference and Noise Ratios (SINRs) of the UEs of an $i^{th}$ user set are determined by Equation 15.

$$SINR_{n,i} = \frac{S_{n,i}}{I_{n,i} + N_0} \quad \text{Equation 15}$$

$$= \frac{|w_{n,i} h_{n,i}| \alpha_{n,i} P_{n,i}}{\sum_{l=i+1}^{L} \sum_{k=1}^{N} |w_{n,i} h_{k,i}|^2 \alpha_{k,i} P_{k,i} \sigma_0^2},$$

where $$|h_{n,1}| > \ldots > |h_{n,i}| > |h_{n,i+1}| > \ldots > |h_{n,L}|$$

where n is a UE indicator, $S_{n,i}$ is the strength of a signal received from an $n^{th}$ UE of the $i^{th}$ user set, $I_{n,i}$ is interference of the $n^{th}$ UE of the $i^{th}$ user set, and $N_o$ is a noise signal, and $\sigma_o$ is a noise variance of the $n^{th}$ UE. The other parameters have been defined in the foregoing equations and thus will not be described to avoid redundancy.

Because as i becomes smaller, interference with an $(i-1)^{th}$ user set increases, a power control factor $\alpha_{n,i}$ for the $n^{th}$ UE of the $i^{th}$ user set is small. In other words, as i gets nearer to L, the power control factor $\alpha_{n,i}$ becomes closer to 1. As the total number of user sets increases, a more elaborate power control is required for NOMA. For this purpose, the power control factor $\alpha_{n,i}$ may be expressed in more than 5 bits.

Now, a detailed description will be given of operations of a transmitter (e.g., a UE) and a receiver (e.g., a BS), including simultaneous transmission and SIC in an uplink MIMO system according to an embodiment of the present disclosure.

FIG. 4 is a flowchart illustrating an overall operation of a BS according to an embodiment of the present disclosure.

Referring to FIG. 4, the BS acquires user channel information by receiving it from UEs in a cell in operation S410.

In operation S420, the BS classifies the UEs of the cell into a strong user set and a weak user set using the user channel information. Specifically, the BS calculates the differences between received signal strengths and interferences from the user channel information and uses the calculated differences.

In operation S430, the BS generates power control factors that maximize the communication capacities of the UEs of the strong user set and the weak user set and transmits the power control factors to associated UEs. Signals from the UEs of the strong user set do not interfere with other UEs. Therefore, the BS transmits a power control factor indicating signal transmission with maximum power within an allowed range of a legacy power control scheme to the UEs of the strong user set. On the other hand, the BS determines a power control factor for the UEs of the weak user set according to a comparison between interference that the weak user set causes to the strong user set and a signal strength of the strong user set. Specifically, if the interference that the weak user set causes to the strong user set is less than the signal strength of the strong user set, it may be determined that the strong user set is robust against the interference from the weak user set. In this case, the BS transmits to the UEs of the weak user set a power control factor indicating signal transmission with maximum power within an allowed range of the legacy power control scheme. On the contrary, if the interference that the weak user set causes to the strong user set is larger than the signal strength of the strong user set, it may be determined that the strong user set is sensitive to the interference from the weak user set. Thus, the BS transmits to the UEs of the weak user set a power control factor indicating signal transmission with power lower than the maximum power.

As described above, the BS classifies user sets capable of simultaneous transmissions into a strong user set and a weak user set and transmits the same or different power control factors to the strong user set and the weak user set according to a comparison between interference that the weak user set causes to the strong user set and a signal strength of the strong user set. Further, the BS transmits an addition power control factor to each UE, for interference mitigation.

Figure 5:
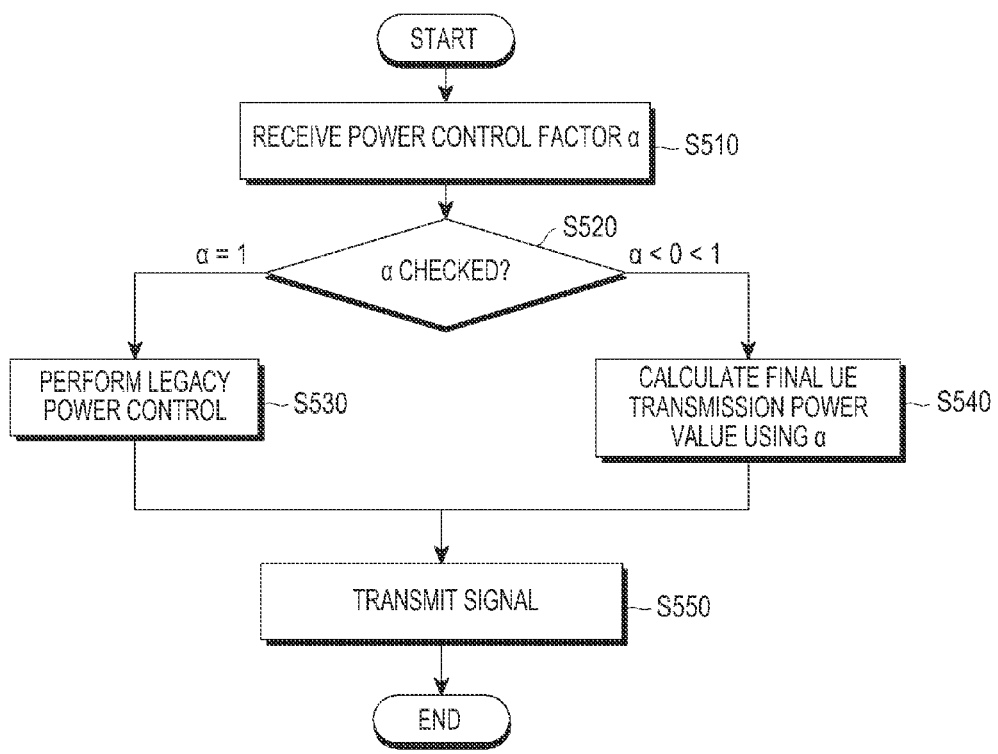
FIG. 5 is a flowchart illustrating an overall operation of a User Equipment (UE) according to an embodiment of the present disclosure.

FIG. 5 is a flowchart illustrating an overall operation of a UE according to an embodiment of the present disclosure.

Referring to FIG. 5, the UE receives a power control factor α from a BS in operation S510.

In operation S520, the UE checks the received power control factor α. If the power control factor α is 1, the UE proceeds to operation S530. If the power control factor α is larger than 0 and smaller than 1 (0<α<1), the UE goes to operation S540.

The UE determines a final UE transmission power value by performing legacy power control irrespective of the received power control factor α in operation S530 and goes to operation S550. In operation S540, the UE calculates a final UE transmission power value using the received power control factor α and then goes to operation S550. The final UE transmission power value is calculated by Equation 14. In operation S550, the UE transmits a signal using power corresponding to the final UE transmission power value. As described above, a UE performing simultaneous transmission transmits its signal using a power value determined by legacy power control based on a power control factor received from a BS or by power control to which the power control factor is applied.

Figure 6:
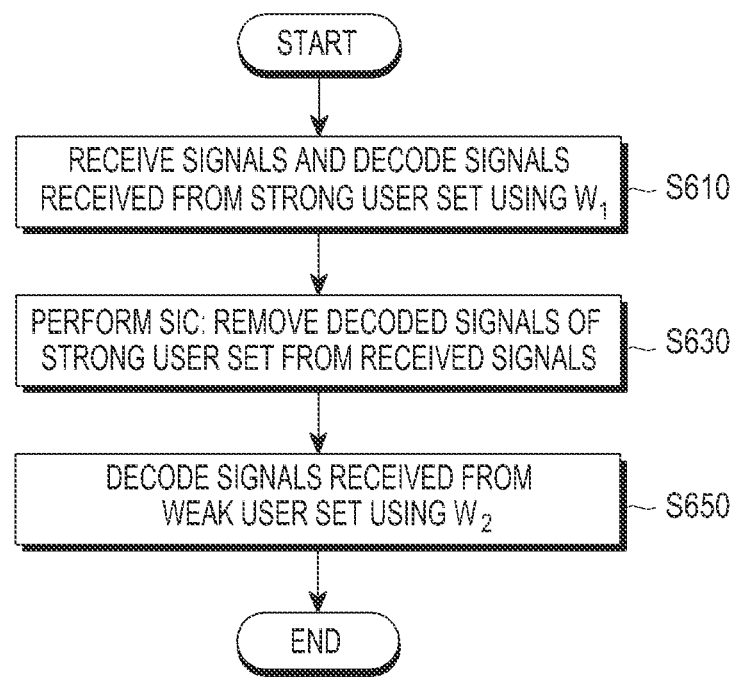
FIG. 6 is a flowchart illustrating an operation for decoding a signal received from a UE after uplink data transmission by a BS that performs Successive Interference Cancellation (SIC) according to an embodiment of the present disclosure.

FIG. 6 is a flowchart illustrating an operation for decoding a signal received from a UE at a BS that performs SIC, after uplink data transmission according to an embodiment of the present disclosure.

Referring to FIG. 6, the BS decodes signals received from the UEs of a strong user set using a post-coding matrix $W_1$ in operation S610.

In operation S630, the BS removes the decoded signals of the UEs of the strong user set from a received signal by SIC. The BS decodes signals received from the UEs of a weak user set using a post-coding matrix $W_2$ in operation S650.

Figure 7:
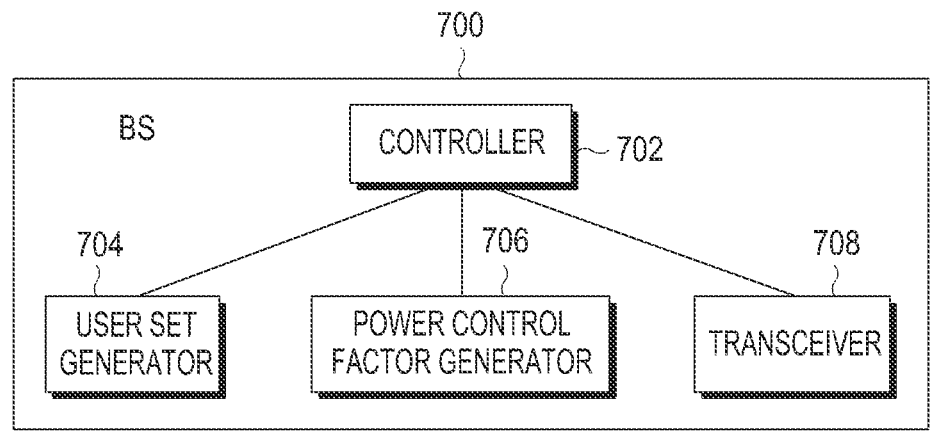
FIG. 7 is a block diagram of a BS according to an embodiment of the present disclosure.

FIG. 7 is a block diagram of a BS according to an embodiment of the present disclosure. For the convenience of description, the components of the BS are configured based on operations according to the foregoing embodiment of the present disclosure. However, some of the components may be integrated into a single unit or one of the components may be divided into a plurality of sub-units.

Referring to FIG. 7, a BS 700 includes, for example, a controller 702, a user set generator 704, a power control factor generator 706, and a transceiver 708. The controller 702 recognizes reception of user channel information from UEs of a cell through the transceiver 708. Then the user set generator 704 arranges channel gains expressed as Equation 2 from the user channel information and selects UEs having higher channel gains as members of a strong user set which is configured to include members having relatively large signal strengths among user sets supposed to transmit signals simultaneously, under the control of the controller 702. The operation for selecting the strong user set by the user set generator 704 has been described before with reference to FIG. 2 and thus will not be described herein to avoid redundancy.

Likewise, the user set generator 704 generates candidate user sets according to equations described with reference to FIG. 3 and selects members of a weak user set, taking into account interference that each candidate user set causes to the strong user set, under the control of the controller 702. The operation for selecting a weak user set by the user set generator 704 has also been described before with reference to FIG. 3 and thus will not be described herein to avoid redundancy.

Upon completion of the selection of members for the user sets that will transmit signals simultaneously in the user set generator 704, the power control factor generator 706 generates a power control factor for each user set under the control of the controller 702. The operation for generating a power control factor for each user set has been described before with reference to FIG. 4 and thus will not be described to avoid redundancy.

Figure 8:
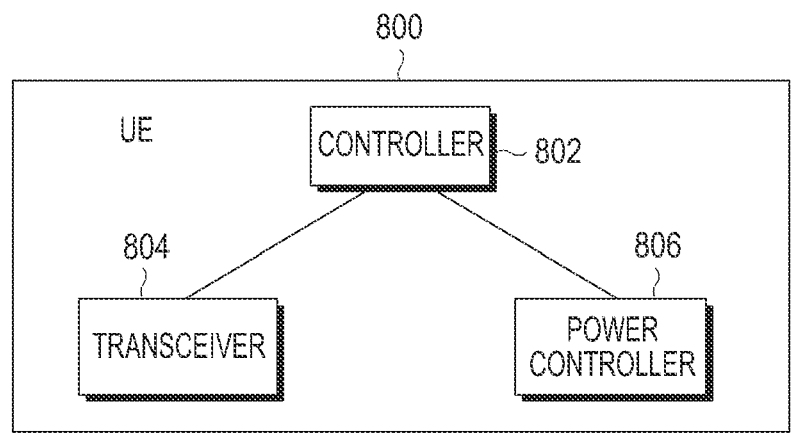
FIG. 8 is a block diagram of a UE according to an embodiment of the present disclosure.

FIG. 8 is a block diagram of a UE according to an embodiment of the present disclosure. For the convenience of description, the components of the UE are configured according to operations according to the foregoing embodiment of the present disclosure. However, some of the components may be integrated into a single unit or one of the components may be divided into a plurality of sub-units.

Referring to FIG. 8, a UE 800 includes, for example, a controller 802, a transceiver 804, and a power controller 806.

When the transceiver 804 recognizes reception of a power control factor from a BS, the controller 802 controls the power controller 806 to adjust power according to the power control factor. The operation of the power controller 806 has been described before with reference to FIG. 5 and thus will not be described herein to avoid redundancy. Then, the transceiver 804 transmits a signal with the controlled power to the BS under the control of the controller 802.

According to the foregoing embodiment of the present disclosure, a BS forms user sets whose communication capacities may be increased using user channel information received from UEs, determines power control factors for the user sets, for interference cancellation, and transmits the power control factors to the UEs. This scheduling scheme can reduce interference between the user sets and increase the number of UEs supported simultaneously even in an environment in which more UEs than the number of antennas at a receiver are supported in an MU-MIMO system. Consequently, communication capacity can be increased.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An uplink scheduling method of a Base Station (BS) in a Multi-User Multiple-Input Multiple-Output (MU-MIMO) system, the method comprising:
   selecting first User Equipments (UEs) as members of a first user set for simultaneous transmission from among third UEs from which channel information is received, using the channel information; and
   generating a power control value for the first user set and transmitting the power control value to the first UEs, wherein the first UEs are selected from among UEs having lower reception power than second UEs included in a second user set, based on an interference that the UEs having the lower reception power than the second UEs cause to the second user set, and wherein the second UEs are selected from among the third UEs based on reception power of the third UEs.

2. The method of claim 1, wherein each of the first user set and the second user set includes as many UEs as the number of transmission antennas in the BS.

3. The method of claim 1, wherein the first UEs are selected in a descending order of differences between reception power of the UEs having the lower reception power than the second UEs and interference that the UEs having the lower reception power than the second UEs cause to the second user set.

4. The method of claim 1, wherein the generating of the power control value comprises:

generating a first power control value indicating signal transmission with maximum power to the second UEs; and generating a second power control value indicating signal transmission with the maximum power or specific power lower than the maximum power to the first UEs.

5. The method of claim 4, wherein the generating of the second power control value comprises:

generating the second power control value indicating signal transmission with the maximum power, if reception power of the second user set is equal to or larger than the interference; and generating the second power control value indicating signal transmission with the specific power lower than the maximum power, if the reception power of the second user set is smaller than the interference.

6. A method for receiving uplink scheduling information in a first User Equipment (UE) in a Multi-User Multiple-Input Multiple-Output (MU-MIMO) system, the method comprising:

receiving a power control value from a Base Station (BS); and transmitting a signal to the BS based on power controlled according to the power control value, wherein the first UE is selected from among UEs having lower reception power than second UEs included in a second user set based on an interference that UEs having the lower reception power than the second UEs cause to a second user set, and wherein the second UEs are selected from among UEs within a cell of the BS.

7. The method of claim 6, wherein each of a first user set and the second user set includes as many UEs as the number of transmission antennas in the BS, the first user set including the first UE.

8. The method of claim 6, wherein the second UEs are selected in a descending order of differences between reception power of the UEs having the lower reception power than the second UEs and interference that the UEs having the lower reception power than the second UEs cause to the second user set.

9. The method of claim 6, wherein the power control value includes a first power control value indicating signal transmission with maximum power to the second UEs of the second user set, and a second power control value indicating signal transmission with the maximum power or specific power lower than the maximum power to the first UEs.

10. The method of claim 9, wherein if reception power of the second user set is equal to or larger than the interference, the second power control value indicates signal transmission with the maximum power, and if the reception power of the second user set is smaller than the interference, the second power control value indicates signal transmission with the specific power lower than the maximum power.

11. A Base Station (BS) for performing uplink scheduling in a Multi-User Multiple-Input Multiple-Output (MU-MIMO) system, the BS comprising:

a controller configured to:

select first User Equipments (UEs) as members of a first user set for simultaneous transmission from among third UEs from which channel information is received, using the channel information, generate a power control value for the first user set, and transmit the power control value to the first UEs, wherein the first UEs are selected from among remaining UEs having lower reception power than second UEs included in a second user set, based on interference that the UEs having the lower reception power than the second UEs cause to the second user, and wherein the second UEs are selected from among the third UEs based on reception power of the third UEs.

12. The BS of claim 11, wherein each of the first user set and the second user set includes as many UEs as the number of transmission antennas in the BS.

13. The BS of claim 11, wherein the first UEs are selected in a descending order of differences between reception power of the UEs having the lower reception power than the second UEs and interference that the UEs having the lower reception power than the second UEs cause to the second user set.

14. The BS of claim 11, wherein the controller is configured to generate a first power control value indicating signal transmission with maximum power to the second UEs, and generate a second power control value indicating signal transmission with the maximum power or specific power lower than the maximum power to the first UEs.

15. The BS of claim 14, wherein if reception power of the second user set is equal to or larger than the interference, the controller is configured to generate the second power control value indicating signal transmission with the maximum power, and if the reception power of the second user set is smaller than the interference, the controller is configured to generate the second power control value indicating signal transmission with the specific power lower than the maximum power.

16. A first User Equipment (UE) for receiving uplink scheduling information in a Multi-User Multiple-Input Multiple-Output (MU-MIMO) system, the UE comprising:

a controller configured to, upon receipt of a power control value from a Base Station (BS), transmit a signal to the BS based on power controlled according to the power control value, wherein the first UE is selected from among UEs having lower reception power than second UEs included in a second user set based on an interference that the UEs having the lower reception power than the second UEs cause to a second user set, and wherein the second UEs are selected from among UEs within a cell of the BS.

17. The UE of claim 16, wherein each of the first user set and a second user set includes as many UEs as the number of transmission antennas in the BS, the first user set including the first UE.

18. The UE of claim 16, wherein the second UEs are selected in a descending order of differences between reception power of the UEs having the lower reception power than the second UEs and interference that the UEs having the lower reception power than the second UEs cause to the second user set.

19. The UE of claim 16, wherein the power control value includes a first power control value indicating signal transmission with maximum power to the second UEs of the second user set, and a second power control value indicating signal transmission with the maximum power or specific power lower than the maximum power to the first UEs.

20. The UE of claim 19, wherein if reception power of the second user set is equal to or larger than the interference, the second power control value indicates signal transmission with the maximum power, and if the reception power of the second user set is smaller than the interference, the second power control value indicates signal transmission with the specific power lower than the maximum power.

* * * * *